US009367676B2

(12) United States Patent
Wilson

(10) Patent No.: US 9,367,676 B2
(45) Date of Patent: Jun. 14, 2016

(54) SYSTEM AND METHOD FOR CONFIRMING LOCATION USING SUPPLEMENTAL SENSOR AND/OR LOCATION DATA

(71) Applicant: NOK NOK LABS, INC., Palo Alto, CA (US)

(72) Inventor: Brendon J. Wilson, San Jose, CA (US)

(73) Assignee: NOK NOK LABS, INC., Palo Alto, CA (US)

( * ) Notice: Subject to any disclaimer, the term of this patent is extended or adjusted under 35 U.S.C. 154(b) by 0 days.

(21) Appl. No.: 14/145,607

(22) Filed: Dec. 31, 2013

(65) Prior Publication Data

US 2014/0289822 A1     Sep. 25, 2014

Related U.S. Application Data

(60) Provisional application No. 61/804,568, filed on Mar. 22, 2013.

(51) Int. Cl.
*G06F 21/32* (2013.01)
*G06Q 20/40* (2012.01)
(Continued)

(52) U.S. Cl.
CPC .............. *G06F 21/32* (2013.01); *G06F 21/577* (2013.01); *G06Q 20/204* (2013.01); *G06Q 20/3224* (2013.01); *G06Q 20/3274* (2013.01); *G06Q 20/3278* (2013.01); *G06Q 20/4012* (2013.01); *G06Q 20/40145* (2013.01); *G06Q 20/42* (2013.01); *G06Q 20/425* (2013.01); *G07F 19/20* (2013.01); *H04L 9/0819* (2013.01); *H04L 9/0822* (2013.01); *H04L 9/0841* (2013.01); *H04L 9/3231* (2013.01); *H04L 9/3247* (2013.01); *H04L 9/3297* (2013.01);

(Continued)

(58) Field of Classification Search
CPC ....... G06F 21/30; G06F 21/31; G06F 21/316; G06F 21/32; H04L 63/0861; H04W 12/06; G06Q 20/40145
See application file for complete search history.

(56) References Cited

U.S. PATENT DOCUMENTS 6,618,806 B1    9/2003  Brown et al.
6,751,733 B1    6/2004  Nakamura et al.
(Continued)

FOREIGN PATENT DOCUMENTS

WO    WO 2013/082190    6/2013

OTHER PUBLICATIONS

Anthony J. Nicholson, "Mobile Device Security Using Transient Authentication," IEEE Transactions on Mobile Computing vol. 5, No. 11, pp. 1489-1502 (Nov. 2006).
(Continued)

*Primary Examiner* — Joseph P Hirl
*Assistant Examiner* — Stephen Gundry
(74) *Attorney, Agent, or Firm* — Nicholson De Vos Webster & Elliott LLP

(57) ABSTRACT

A system, apparatus, method, and machine readable medium are described for performing authentication using environmental data. For example, one embodiment of a method comprises: collecting environmental sensor data from one or more sensors of a client device; using a geographical location reported by the device to collect supplemental data for the location; comparing the environmental sensor data with the supplemental data to arrive at a correlation score; and responsively selecting one or more authentication techniques for authenticating a user of the client device based on the correlation score.

24 Claims, 9 Drawing Sheets

(51) Int. Cl.

| | | |
|---|---|---|
| *G06Q 20/42* | (2012.01) | |
| *H04L 9/32* | (2006.01) | |
| *H04L 29/06* | (2006.01) | |
| *H04L 9/08* | (2006.01) | |
| *G06F 21/57* | (2013.01) | |
| *G07F 19/00* | (2006.01) | |
| *G06Q 20/20* | (2012.01) | |
| *G06Q 20/32* | (2012.01) | |
| *H04W 12/06* | (2009.01) | |

(52) U.S. Cl.
CPC ............ *H04L63/0492* (2013.01); *H04L 63/08* (2013.01); *H04L 63/083* (2013.01); *H04L 63/0861* (2013.01); *H04L 63/20* (2013.01); *G06F 2221/2115* (2013.01); *H04L 2209/805* (2013.01); *H04L 2463/102* (2013.01); *H04W 12/06* (2013.01)

(56) References Cited

U.S. PATENT DOCUMENTS

| | | | |
|---|---|---|---|
| 6,938,156 | B2 | 8/2005 | Wheeler et al. |
| 7,487,357 | B2 | 2/2009 | Smith |
| 7,698,565 | B1 | 4/2010 | Bjorn et al. |
| 8,060,922 | B2 | 11/2011 | Crichton |
| 8,166,531 | B2 | 4/2012 | Suzuki |
| 8,245,030 | B2 | 8/2012 | Lin |
| 8,353,016 | B1 | 1/2013 | Pravetz et al. |
| 8,584,224 | B1 | 11/2013 | Pei et al. |
| 8,646,060 | B1* | 2/2014 | Ben Ayed ............ H04L 63/0853 726/9 |
| 8,713,325 | B2 | 4/2014 | Ganesan |
| 8,719,905 | B2 | 5/2014 | Ganesan |
| 8,776,180 | B2 | 7/2014 | Kumar et al. |
| 8,856,541 | B1 | 10/2014 | Chaudhury et al. |
| 8,949,978 | B1 | 2/2015 | Lin |
| 8,958,599 | B1 | 2/2015 | Starner |
| 8,978,117 | B2* | 3/2015 | Bentley et al. ..................... 726/7 |
| 9,032,485 | B2 | 5/2015 | Chu |
| 2002/0073316 | A1 | 6/2002 | Collins et al. |
| 2002/0174344 | A1 | 11/2002 | Ting |
| 2003/0065805 | A1* | 4/2003 | Barnes, Jr. ..................... 709/231 |
| 2003/0087629 | A1 | 5/2003 | Juitt |
| 2003/0135740 | A1 | 7/2003 | Talmor et al. |
| 2003/0226036 | A1 | 12/2003 | Bivens et al. |
| 2004/0101170 | A1 | 5/2004 | Tisse |
| 2004/0123153 | A1* | 6/2004 | Wright et al. ................. 713/201 |
| 2005/0160052 | A1 | 7/2005 | Schneider |
| 2005/0223236 | A1 | 10/2005 | Yamada et al. |
| 2005/0278253 | A1 | 12/2005 | Meek et al. |
| 2006/0029062 | A1 | 2/2006 | Rao |
| 2006/0282670 | A1 | 12/2006 | Karchov |
| 2007/0005988 | A1* | 1/2007 | Zhang et al. .................. 713/186 |
| 2007/0088950 | A1 | 4/2007 | Wheeler et al. |
| 2007/0107048 | A1 | 5/2007 | Halls et al. |
| 2007/0165625 | A1 | 7/2007 | Elsner |
| 2007/0168677 | A1* | 7/2007 | Kudo et al. ................... 713/185 |
| 2007/0169182 | A1 | 7/2007 | Wolfond |
| 2007/0278291 | A1 | 12/2007 | Rans et al. |
| 2008/0005562 | A1 | 1/2008 | Sather et al. |
| 2008/0025234 | A1 | 1/2008 | Zhu |
| 2008/0046334 | A1 | 2/2008 | Lee et al. |
| 2008/0046984 | A1 | 2/2008 | Bohmer et al. |
| 2008/0049983 | A1 | 2/2008 | Miller et al. |
| 2008/0086759 | A1 | 4/2008 | Colson |
| 2008/0134311 | A1 | 6/2008 | Medvinsky |
| 2008/0172725 | A1* | 7/2008 | Fujii et al. ......................... 726/5 |
| 2008/0235801 | A1 | 9/2008 | Soderberg et al. |
| 2008/0271150 | A1 | 10/2008 | Boerger et al. |
| 2008/0289019 | A1 | 11/2008 | Lam |
| 2008/0313719 | A1 | 12/2008 | Kaliski, Jr. et al. |
| 2008/0320308 | A1 | 12/2008 | Kostiainen et al. |
| 2009/0064292 | A1 | 3/2009 | Carter et al. |
| 2009/0089870 | A1 | 4/2009 | Wahl |
| 2009/0116651 | A1 | 5/2009 | Liang |
| 2009/0133113 | A1 | 5/2009 | Schneider |
| 2009/0138724 | A1 | 5/2009 | Chiou et al. |
| 2009/0138727 | A1 | 5/2009 | Campello |
| 2009/0158425 | A1 | 6/2009 | Chan et al. |
| 2009/0183003 | A1 | 7/2009 | Haverinen |
| 2009/0204964 | A1 | 8/2009 | Foley |
| 2009/0235339 | A1 | 9/2009 | Mennes et al. |
| 2009/0328197 | A1 | 12/2009 | Newell |
| 2010/0029300 | A1* | 2/2010 | Chen ........................ 455/456.3 |
| 2010/0042848 | A1 | 2/2010 | Rosener |
| 2010/0070424 | A1 | 3/2010 | Monk |
| 2010/0082484 | A1* | 4/2010 | Erhart et al. ..................... 705/44 |
| 2010/0105427 | A1* | 4/2010 | Gupta ........................ 455/556.1 |
| 2010/0169650 | A1 | 7/2010 | Brickell et al. |
| 2010/0175116 | A1* | 7/2010 | Gum ................................. 726/6 |
| 2010/0186072 | A1 | 7/2010 | Kumar |
| 2010/0223663 | A1* | 9/2010 | Morimoto et al. ................ 726/7 |
| 2010/0242088 | A1 | 9/2010 | Thomas |
| 2010/0325664 | A1 | 12/2010 | Kang |
| 2010/0325711 | A1* | 12/2010 | Etchegoyen ...................... 726/7 |
| 2011/0004933 | A1* | 1/2011 | Dickinson ............... H04L 63/08 726/17 |
| 2011/0022835 | A1 | 1/2011 | Schibuk |
| 2011/0047608 | A1* | 2/2011 | Levenberg ......... H04L 63/0807 726/7 |
| 2011/0078443 | A1 | 3/2011 | Greenstein et al. |
| 2011/0082801 | A1 | 4/2011 | Baghdasaryan et al. |
| 2011/0083016 | A1 | 4/2011 | Kesanupalli et al. |
| 2011/0107087 | A1 | 5/2011 | Lee et al. |
| 2011/0167154 | A1 | 7/2011 | Bush et al. |
| 2011/0191200 | A1 | 8/2011 | Bayer et al. |
| 2011/0197267 | A1 | 8/2011 | Gravel et al. |
| 2011/0219427 | A1 | 9/2011 | Hito et al. |
| 2011/0246766 | A1 | 10/2011 | Orsini et al. |
| 2011/0265159 | A1 | 10/2011 | Ronda |
| 2011/0279228 | A1 | 11/2011 | Kumar |
| 2011/0280402 | A1 | 11/2011 | Ibrahim et al. |
| 2011/0296518 | A1 | 12/2011 | Faynberg et al. |
| 2011/0307949 | A1 | 12/2011 | Ronda |
| 2011/0314549 | A1 | 12/2011 | Song et al. |
| 2012/0018506 | A1 | 1/2012 | Hammad et al. |
| 2012/0023568 | A1 | 1/2012 | Cha et al. |
| 2012/0046012 | A1* | 2/2012 | Forutanpour et al. .......... 455/411 |
| 2012/0084566 | A1 | 4/2012 | Chin et al. |
| 2012/0102553 | A1 | 4/2012 | Hsueh et al. |
| 2012/0124651 | A1 | 5/2012 | Ganesan |
| 2012/0159577 | A1 | 6/2012 | Belinkiy |
| 2012/0191979 | A1 | 7/2012 | Feldbau |
| 2012/0204032 | A1 | 8/2012 | Wilkings |
| 2012/0272056 | A1 | 10/2012 | Ganesan |
| 2012/0313746 | A1 | 12/2012 | Rahman et al. |
| 2012/0317297 | A1* | 12/2012 | Bailey ............................ 709/229 |
| 2013/0042327 | A1* | 2/2013 | Chow ............................... 726/28 |
| 2013/0046976 | A1 | 2/2013 | Rosati |
| 2013/0061055 | A1 | 3/2013 | Schibuk |
| 2013/0073859 | A1 | 3/2013 | Carlson et al. |
| 2013/0090939 | A1 | 4/2013 | Robinson |
| 2013/0097682 | A1 | 4/2013 | Zeljkovic |
| 2013/0104190 | A1 | 4/2013 | Simske |
| 2013/0119130 | A1 | 5/2013 | Braams |
| 2013/0124285 | A1 | 5/2013 | Pravetz et al. |
| 2013/0125197 | A1 | 5/2013 | Pravetz |
| 2013/0125222 | A1 | 5/2013 | Pravetz et al. |
| 2013/0133049 | A1* | 5/2013 | Peirce ............................... 726/6 |
| 2013/0144785 | A1 | 6/2013 | Karpenko |
| 2013/0159413 | A1* | 6/2013 | Davis et al. ................... 709/204 |
| 2013/0159716 | A1 | 6/2013 | Buck et al. |
| 2013/0337777 | A1 | 12/2013 | Deutsch et al. |
| 2014/0007215 | A1 | 1/2014 | Romano |
| 2014/0013422 | A1* | 1/2014 | Janus et al. ..................... 726/19 |
| 2014/0040987 | A1 | 2/2014 | Haugsnes |
| 2014/0044265 | A1 | 2/2014 | Kocher et al. |
| 2014/0066015 | A1 | 3/2014 | Aissi |
| 2014/0068746 | A1 | 3/2014 | Gonzalez |
| 2014/0075516 | A1 | 3/2014 | Chermside |
| 2014/0089243 | A1* | 3/2014 | Oppenheimer ................... 706/46 |
| 2014/0096182 | A1 | 4/2014 | Smith |
| 2014/0101439 | A1 | 4/2014 | Pettigrew et al. |

(56) References Cited

U.S. PATENT DOCUMENTS

| | | | |
|---|---|---|---|
| 2014/0109174 A1 | 4/2014 | Barton | |
| 2014/0115702 A1 | 4/2014 | Li et al. | |
| 2014/0130127 A1* | 5/2014 | Toole et al. | 726/3 |
| 2014/0137191 A1* | 5/2014 | Goldsmith et al. | 726/3 |
| 2014/0164776 A1 | 6/2014 | Hook et al. | |
| 2014/0173754 A1 | 6/2014 | Barbir | |
| 2014/0188770 A1* | 7/2014 | Agrafioti et al. | 706/13 |
| 2014/0189350 A1 | 7/2014 | Baghdasaryan | |
| 2014/0189360 A1 | 7/2014 | Baghdasaryan | |
| 2014/0189779 A1 | 7/2014 | Baghdasaryan | |
| 2014/0189791 A1 | 7/2014 | Lindemann | |
| 2014/0189807 A1 | 7/2014 | Cahill et al. | |
| 2014/0189808 A1 | 7/2014 | Mahaffey et al. | |
| 2014/0189828 A1 | 7/2014 | Baghdasaryan | |
| 2014/0201809 A1 | 7/2014 | Choyi et al. | |
| 2014/0250523 A1* | 9/2014 | Savvides et al. | 726/19 |
| 2014/0258125 A1 | 9/2014 | Gerber et al. | |
| 2014/0258711 A1 | 9/2014 | Brannon | |
| 2014/0282868 A1* | 9/2014 | Sheller et al. | 726/3 |
| 2014/0282945 A1 | 9/2014 | Smith et al. | |
| 2014/0282965 A1* | 9/2014 | Sambamurthy et al. | 726/7 |
| 2014/0289833 A1 | 9/2014 | Briceno et al. | |
| 2014/0298419 A1 | 10/2014 | Boubez | |
| 2015/0180869 A1 | 6/2015 | Verma | |
| 2015/0269050 A1 | 9/2015 | Filimonov | |
| 2015/0326529 A1 | 11/2015 | Morita | |
| 2015/0381580 A1 | 12/2015 | Graham et al. | |

OTHER PUBLICATIONS

Mohammad O. Derawi, "Unobtrusive User-Authentication on Mobile Phones using Biometric Gait Recognition" (2010).
Koichiro Niinuma, Anil K. Jain, "Continuous User Authentication Using Temporal Information" (currently at http://www.cse.msu.edu/biometrics/Publications/Face/NiinumaJain_ContinuousAuth_SPIE10.pdf).
BehavioSec, "Measuring FAR/FRR/EER in Continuous Authentication," Stockholm, Sweden (2009).
the Online Certificate Status Protocol (OCSP, RFC2560), Jun. 1999, 22 pages.
see current WikiPedia article for "Eye Tracking" at en.wikipedia.org/wiki/Eye_tracking (15 pages), 2014.
(see Hartzell, "Crazy Egg Heatmap Shows Where People Click on Your Website" (Nov. 30, 2012), currently at www.michaelhartzell.com/Blog/bid/92970/Crazy-Egg-Heatmap-shows-where-people-click-on-your-website).
Notification of Transmittal of the International Search Report and the Written Opinion from counterpart Patent Cooperation Treaty Application No. PCT/US13/77888, mailed Aug. 8, 2014, 10 pages.
Notification of Transmittal of the International Search Report and the Written Opinion from counterpart Patent Cooperation Treaty Application No. PCT/US14/39627, mailed Oct. 16, 2014, 10 pages.
Notification of Transmittal of the International Search Report and the Written Opinion from counterpart Patent Cooperation Treaty Application No. PCT/US14/31344, mailed Nov. 3, 2014, 8 pages.
Office Action from U.S. Appl. No. 14/066,384, mailed Jan. 7, 2015, 24 pages.
Office Action from U.S. Appl. No. 14/145,439, mailed Feb. 12, 2015, 18 pages.
Office Action from U.S. Appl. No. 14/145,533, mailed Jan. 26, 2015, 13 pages.
Office Action from U.S. Appl. No. 14/218,551, mailed Apr. 23, 2015, 9 pages.
Office Action from U.S. Appl. No. 14/218,575, mailed Feb. 10, 2015, 17 pages.
Office Action from U.S. Appl. No. 14/066,273, mailed May 8, 2015, 31 pages.
Notice of Allowance from U.S. Appl. No. 14/145,533, mailed May 11, 2015, 5 pages.
Notice of Allowance from U.S. Appl. No. 14/145,439, mailed Jul. 6, 2015, 6 pages.
Office Action from U.S. Appl. No. 14/268,733, mailed Jul. 16, 2015, 13 pages.
Notification of Transmittal of the International Search Report and the Written Opinion from counterpart Patent Cooperation Treaty Application No. PCT/US2015/028924, mailed Jul. 30, 2015, 10 pages.
Office Action from U.S. Appl. No. 14/218,575, mailed Aug. 7, 2015, 19 pages.
Final Office Action from U.S. Appl. No. 14/066,384, mailed Aug. 20, 2015, 23 pages.
Office Action from U.S. Appl. No. 14/268,619, mailed Aug. 24, 2015, 17 pages.
Final Office Action from U.S. Appl. No. 14/218,551, mailed Sep. 9, 2015, 15 pages.
Notice of Allowance from U.S. Appl. No. 14/145,533, mailed Sep. 14, 2015, 13 pages.
Notice of Allowance from U.S. Appl. No. 14/448,697, mailed Sep. 15, 2015, 14 pages.
Notification of Transmittal of the International Search Report and the Written Opinion from counterpart Patent Cooperation Treaty Application No. PCT/US2015/042785, mailed Oct. 16, 2015, 8 pages.
Notification of Transmittal of the International Search Report and the Written Opinion from counterpart Patent Cooperation Treaty Application No. PCT/US2015/042799, mailed Oct. 19, 2015, 13 pages.
Notice of Allowance from U.S. Appl. No. 14/268,686, mailed Nov. 5, 2015, 23 pages.
Office Action from U.S. Appl. No. 14/448,641, mailed Nov. 9, 2015, 21 pages.
Barker et al; "Recommendation for key management Part 3: Application—Specific Key Management Guidance"; NIST special Publication 800-57, pp. 1-103, Dec. 2009.
Office Action from U.S. Appl. No. 14/448,814, mailed Aug. 4, 2015, 13 pages.
World Wide Web Consortium, W3C Working Draft: Media Capture and Streams (2013).
Office Action from U.S. Appl. No. 14/218,692, mailed Nov. 4, 2015, 16 pages.
Notice of Allowance from U.S. Appl. No. 14/145,439, mailed Oct. 28, 2015, 12 pages.
Brickell, Ernie, Jan Camenisch, and Liqun Chen. "Direct anonymous attestation." *Proceedings of the 11th ACM conference on Computer and communications security*. ACM, 2004, 6 pages.
Chen, Liqun, and Jiangtao Li. "Flexible and scalable digital signatures in TPM 2.0." *Proceedings of the 2013 ACM SIGSAC conference on Computer & communications security*. ACM, 2013.
Chakka, Murali Mohan, et al. "Competition on counter measures to 2-d facial spoofing attacks." *Biometrics (IJCB)*, 2011 *International Joint Conference on*. IEEE, 2011, 6 pages.
Marcialis, Gian Luca, et al. "First international fingerprint liveness detection competition—livdet 2009." *Image Analysis and Processing—ICIAP* 2009. Springer Berlin Heidelberg, 2009. 12-23.
Uludag, Umut, and Anil K. Jain. "Attacks on biometric systems: a case study in fingerprints." *Electronic Imaging 2004*. International Society for Optics and Photonics, 2004, 12 pages.
Ratha, Nalini K., Jonathan H. Connell, and Ruud M. Bolle. "An analysis of minutiae matching strength." *Audio-and Video-Based Biometric Person Authentication*. Springer Berlin Heidelberg, 2001, 7 pages.
Schneier, B., "Biometrics: Uses and Abuses". Aug. 1999. Inside Risks 110 (CACM 42, 8, Aug. 1999). http://www.schneier.com/essay-019.pdf.
Zhao, W., et al. "Face Recognition: A Literature Survey". ACM Computing Surveys, vol. 35, No. 4. Dec. 2003, pp. 399-458.
Abate, A., et al., "2D and 3D face recognition: A survey". Pattern Recognition Letters. 2007, 28, pp. 1885-1906.
GSM Arena. GSM Arena. [Online] Nov. 13, 2011. [Cited: Sep. 29, 2012.] http://www.gsmarena.com/ice_cream_sandwichs_face_unlock_duped_using_a_photograph-news-3377.php. Downloaded Aug. 18, 2015.
Wilson, R., James. Unbuntu Life, "How to Trick Google's New Face Unlock on Android 4.1 Jelly Bean". Print Screen Mac. [Online] Aug. 6, 2012. [Cited: Sep. 28, 2012.] http://printscreenmac.info/how-to-trick-android-jelly-bean-face-unlock/. downloaded Aug. 13, 2015.

(56) References Cited

OTHER PUBLICATIONS

Phillips, P., J., et al., "Face Recognition Vendor Test 2002: Evaluation Report". s.l.: NISTIR 6965, 2002. 56 pages. http://www.face-rec.org/vendors/FRVT_2002_Evaluation_Report.pdf.
Phillips, P.J., et al., "FRVT 2006 and ICE 2006 Large-Scale Results", NIST IR 7408. Gaithersburg: NIST, 2006. Mar. 29, 2007. pp. 1-55.
Grother, P.J., et al., NIST. Report on the Evaluation of 2D Still-Image Face Recognition Algorithms, NIST IR 7709. s.l.: NIST, 2011. Jun. 22, 2010. pp. 1-58.
Roberts, C., "Biometric Attack Vectors and Defences". Sep. 2006. 25 pages. http://otago.ourarchive.ac.nz/bitstream/handle/10523/1243/BiometricAttackVectors.pdf.
Pinto, A., et al., "Video-Based Face Spoofing Detection through Visual Rhythm Analysis". Los Alamitos: IEEE Computer Society Conference Publishing Services, 2012. Conference on Graphics, Patterns and Images, 25. 8 pages. (SIBGRAPI). http://sibgrapi.sid.inpe.br/rep/sid.inpe.br/sibgrapi/2012/07.13.21.16?mirror=sid.inpe.br/banon/2001/03.30.15.38.24&metadatarepository=sid.inpe.br/sibgrapi/2012/07.13.21.16.53.
Li, J., et al., "Live Face Detection Based on the Analysis of Fourier Spectra". Biometric Technology for Human Identification. 2004, pp. 296-303.
Tan, X., et al., "Face Liveness Detection from a Single Image with Sparse Low Rank Bilinear Discriminative Model". s.l.: European Conference on Computer Vision, 2010. pp. 1-14.
Määttä, J., et al., "Machine Vision Group, University of Oulu", Finland. "Face Spoofing Detection From Single Images Using Micro-Texture Analysis". Oulu, Finland: IEEE, 2011. pp. 1-7. http://www.ee.oulu.fi/research/mvmp/mvg/files/pdf/131.pdf.
Heikkila, M., et al., "A Texture-Based Method for Modeling the Background and Detecting Moving Objects". Oulu: IEEE, Jun. 22, 2005. DRAFT. 16 pages. http://www.ee.oulu.fi/mvg/files/pdf/pdf_662.pdf.
Peng, Y., et al. "RASL: Robust Alignment by Sparse and Low-rank Decomposition for Linearly Correlated Images". IEEE Conference on Computer Vision and Pattern Recognition. 2010, pp. 763-770. http://yima.csl.illinois.edu/psfile/RASL_CVPR10.pdf.
Kong, S., et al., "Recent advances in visual and infrared face recognition"—a review. Journal of Computer Vision and Image Understanding. Jun. 2005, vol. 1, 97, pp. 103-135.
Kollreider, K., et al., Halmstad University, SE-30118, Sweden. Evaluating Liveness by Face Images and the Structure Tensor. Halmstad, Sweden: s.n., 2005. http://citeseerx.ist.psu.edu/viewdoc/download?doi=10.1.1.62.6534&rep=rep1&type=p.df.
Smiatacz, M., et al., Gdansk University of Technology. Liveness Measurements Using Optical Flow for Biometric Person. Authentication. Metrology and Measurement Systems. 2012, vol. XIX, 2. pp. 257-268.
Bao, W., et al., et al.,"A liveness detection method for face recognition based on optical flow field". Image Analysis and Signal Processing, IASP 2009. Apr. 11-12, 2009, pp. 233-236. http://ieeexplore.ieee.org/stamp/stamp.jsp?tp=&arnumber=5054589&isnumber=5054562.
Pan, G., et al., "Liveness Detection for Face Recognition". Recent Advances in Face Recognition. Vienna: I-Tech, 2008, Ch. 9, pp. 109-124, ISBN: 978-953-7619-34-3.
National Science & Technology Council's Subcommittee on Biometrics. Biometrics Glossary. 33 pages, Last updated Sep. 14, 2006. NSTC. http://www.biometrics.gov/documents/glossary.pdf.
Ross, A., et al. "Multimodal Biometrics: An Overview". Proceedings of 12th European Signal Processing Conference (EUSIPCO). Sep. 2004, pp. 1221-1224. http://www.csee.wvu.edu/~ross/pubs/RossMultimodalOverview_EUSIPC004.pdf.
Rodrigues, R.N., et al. Robustness of multimodal biometric fusion methods against spoof attacks. Journal of Visual Language and Computing. 2009. 11 pages, doi:10.1016/j.jvlc.2009.01.010;http://cubs.buffalo.edu/govind/papers/visual09.pdf.
Akhtar, Z., et al., "Spoof Attacks on Multimodal Biometric Systems". Alfarid. Singapore: IACSIT Press, Singapore, 2011. 2011 International Conference on Information and Network Technology IPCSIT. vol. 4. pp. 46-51. http://www.ipcsit.com/vol4/9-ICINT2011T046.pdf.
Hernandez, T., "But What Does It All Mean? Understanding Eye-Tracking Results (Part 3)", Sep. 4, 2007, 2 pages. EyeTools. Part III: What is a heatmap . . . really? [Online] [Cited: Nov. 1, 2012.] http://eyetools.com/articles/p3-understanding-eye-tracking-what-is-a-heatmap-really.
Nielsen, Jakob. useit.com. Jakob Nielsen's Alertbox—Scrolling and Attention. [Online] Mar. 22, 2010. [Cited: Nov. 1, 2012.] 6 pages. http://www.useit.com/alertbox/scrolling-attention.html.
Nielsen, Jakib. useit.com. Jakob Nielsen's Alertbox—Horizontal Attention Leans Left. [Online] Apr. 6, 2010. [Cited: Nov. 1, 2012.] 4 pages. http://www.useit.com/alertbox/horizontal-attention.html.
Lubin, G., et al., Business Insider. "16 Heatmaps That Reveal Exactly Where People Look". [Online] May 21, 2012. [Cited: Nov. 1, 2012.] pp. 1-21. http://www.businessinsider.com/eye-tracking-heatmaps-2012-5?op=1.
Huang, L., et al., "Clickjacking: Attacks and Defenses". s.l.: Usenix Security 2012, pp. 1-16, 2012. https://www.usenix.org/system/files/conference/usenixsecurity12/sec12-final39.pdf.
Willis, N., Linux.com. Weekend Project: Take a Tour of Open Source Eye-Tracking Software. [Online] Mar. 2, 2012. [Cited: Nov. 1, 2012.]https://www.linux.com/learn/tutorials/550880-weekend-project-take-a-tour-of-open-source-eye-tracking-software.
Chetty, G. School of ISE, University of Canberra, Australia. "Multi-level liveness verification for face-voice biometric authentication". BYSM-2006 Symposium. Baltimore: BYSM-Symposium, 9 pages. Sep. 19, 2006. http://www.biometrics.org/bc2006/presentations/Tues_Sep_19/BSYM/19_Chetty_research.pdf.
Tresadern, P., et al., "Mobile Biometrics (MoBio): Joint Face and Voice Verification for a Mobile Platform". 2012. http://personal.ee.surrey.ac.uk/Personal/Norman.Poh/data/tresadern_PeryComp2012_draft.pdf.
Jafri, R., et al., "A Survey of Face Recognition Techniques. Journal of Information Processing Systems", vol. 5, No. 2, Jun. 2009. Jun. 2009, vol. 5, 2, pp. 41-68. http://www.cosy.sbg.ac.at/~uhl/face_recognition.pdf.
Himanshu, et al., "A Review of Face Recognition". International Journal of Research in Engineering & Applied Sciences. Feb. 2012, vol. 2, 2, pp. 835-846. http://euroasiapub.org/IJREAS/Feb2012/81.pdf.
Phillips, P. J., et al., "Biometric Image Processing and Recognition". Chellappa. 1998. Eusipco. 8 pages.
Zhou, et al., "Face Recognition from Still Images and Videos". University of Maryland, College Park, MD 20742. Maryland: s.n., Nov. 5, 2004. pp. 1-23, http://citeseerx.ist.psu.edu/viewdoc/download-?doi=10.1.1.77.1312&rep=rep1&type=pdf.
Quinn, G.W., et al., NIST. "Performance of Face Recognition Algorithms on Compressed Images", NIST Inter Agency Report 7830. s.l.: NIST, Dec. 4, 2011.
The Extended M2VTS Database. [Online] [Cited: Sep. 29, 2012.] downloaded Jan. 28, 2015, 1 page; http://www.ee.surrey.ac.uk/CVSSP/xm2vtsdb/.
Ratha, N. K., et al., IBM. "Enhancing security and privacy in biometrics-based authentication systems". IBM Systems Journal. 2001, vol. 40, 3. pp. 614-634.
Schuckers, S., Schuckers SAC. "Spoofing and Anti-Spoofing Measures". Information Security Technical Report. Dec. 10, 2002, vol. 7, 4., pp. 56-62.
Schwartz, W., et al., "Face Spoofing Detection through Partial Least Squares and Low-Level Descriptors". s.l.: Intl. Joint Conference on Biometrics 2011. pp. 1-8.
Edited by Kresimir Delac, Mislav Grgic and Marian Stewart Bartlett. s.l.: InTech, Jun. 1, 2008. http://cdn.intechopen.com/finals/81/InTech-Recent_advances_in_face_recognition.zip. ISBN 978-953-7619-34-3. Uploaded as Chapters 1-15.
Pan, G., et al., "Monocular camera-based face liveness detection by combining eyeblink and scene context" pp. 215-225. s.l.: Springer Science+Business Media, LLC, Aug. 4, 2010. http://www.cs.zju.edu.cn/~gpan/publication/2011-TeleSys-liveness.pdf.

(56) References Cited

OTHER PUBLICATIONS

Tronci, R, et al., "Fusion of multiple clues for photo-attack detection in face recognition systems". 09010 Pula (CA), Italy: s.n., 2011. pp. 1-6. http://prag.diee.unica.it/pra/system/files/Amilab_IJCB2011.pdf.

Rocha, A., et al., "Vision of the Unseen: Current Trends and Challenges in Digital Image and Video Forensics". s.l.: ACM Computing Surveys, 2010. http://www.wjscheirer.com/papers/wjs_csur2011_forensics.pdf.

Brickell, E., et al., Intel Corporation; Jan Camenish, IBM Research; Liqun Chen, HP Laboratories. "Direct Anonymous Attestation". Feb. 11, 2004, pp. 1-28. http://eprint.iacr.org/2004/205.pdf.

Linux.com, The source for Linux information. 2012. 3 pages, downloaded Jan. 28, 2015.

Kollreider, K., et al., "Non-instrusive liveness detection by face images". Image Vis. Comput. (2007). doi:10.1016/j.imavis.2007.05.004, Received Feb. 18, 2006, received in revised form, Jan. 24, 2007 and accepted May 22, 2007. 12 pages.

Notification of Transmittal of the International Search Report and the Written Opinion from counterpart Patent Cooperation Treaty Application No. PCT/US2015/042870, mailed Oct. 30, 2015, 9 pages.

Notification of Transmittal of the International Search Report and the Written Opinion from counterpart Patent Cooperation Treaty Application No. PCT/US2015/42827, mailed Oct. 30, 2015, 9 pages.

Notification of Transmittal of the International Search Report and the Written Opinion from counterpart Patent Cooperation Treaty Application No. PCT/US15/50348, mailed Dec. 22, 2015, 9 pages.

Transmittal of International Preliminary Report On Patentability from foreign counterpart PCT Patent Application No. PCT/US2014/039627 mailed Dec. 10, 2015, 8 pages.

Office Action from U.S. Appl. No. 14/448,868, mailed Dec. 3, 2015, 15 pages.

Office Action from U.S. Appl. No. 14/487,992, mailed Dec. 31, 2015, 12 pages.

Final Office Action from U.S. Appl. No. 14/268,619, mailed Dec. 14, 2015, 10 pages.

Notice of Allowance from U.S. Appl. No. 14/448,697, mailed Jan. 14, 2016, 23 pages.

Final Office Action from U.S. Appl. No. 14/268,733, mailed Jan. 15, 2016, 14 pages.

Notice of Allowance from U.S. Appl. No. 14/145,533, mailed Jan. 20, 2016, 12 pages.

Office Action from U.S. Appl. No. 14/218,743, mailed Jan. 21, 2016, 12 pages.

Office Action from U.S. Appl. No. 14/218,551, mailed Jan. 21, 2016, 11 pages.

Final Office Action from U.S. Appl. No. 14/448,814, mailed Feb. 16, 2016, 14 pages.

Final Office Action from U.S. Appl. No. 14/066,273, mailed Feb. 11, 2016, 29 pages.

Final Office Action from U.S. Appl. No. 14/218,692, mailed Mar. 2, 2016, 24 pages.

Final Office Action from U.S. Appl. No. 14/218,646, mailed Mar. 2, 2016, 23 pages.

Notice of Allowance from U.S. Appl. No. 14/145,439, mailed Mar. 14, 2016, 17 pages.

Notice of Allowance from U.S. Appl. No. 14/066,384, mailed Mar. 17, 2016, 40 pages.

Office Action from U.S. Appl. No. 14/268,619, mailed Mar. 21, 2016, 7 pages.

Notice of Allowance from U.S. Appl. No. 14/268,686, mailed Mar. 30, 2016, 38 pages.

* cited by examiner

Authentication Policy 211

| Rule | Location Class | Minimum Authentication Required |
|---|---|---|
| 1 | Location Class 1 | Authentication Technique(s) 1 |
| 2 | Location Class 2 | Authentication Technique(s) 2 |
| 3 | Location Class 3 | Authentication Technique(s) 3 |
| 4 | Location Class 4 | Authentication Technique(s) 4 |
| 5 | Location Class 5 | Authentication Technique(s) 5 |
| ------ | ------ | ------ |

FIG. 3

SYSTEM AND METHOD FOR CONFIRMING LOCATION USING SUPPLEMENTAL SENSOR AND/OR LOCATION DATA

CROSS REFERENCE TO RELATED APPLICATIONS

This application claims the benefit of and priority to U.S. Provisional Patent Application No. 61/804,568, filed, Mar. 22, 2013, entitled, "Advanced Methods of Authentication And Its Applications".

BACKGROUND

1. Field of the Invention

This invention relates generally to the field of data processing systems. More particularly, the invention relates to a system and method for confirmation or refuting a device location using supplemental sensor and/or location data.

2. Description of Related Art

FIG. 1 illustrates an exemplary client 120 with a biometric device 100. When operated normally, a biometric sensor 102 reads raw biometric data from the user (e.g., capture the user's fingerprint, record the user's voice, snap a photo of the user, etc) and a feature extraction module 103 extracts specified characteristics of the raw biometric data (e.g., focusing on certain regions of the fingerprint, certain facial features, etc). A matcher module 104 compares the extracted features 133 with biometric reference data 110 stored in a secure storage on the client 120 and generates a score based on the similarity between the extracted features and the biometric reference data 110. The biometric reference data 110 is typically the result of an enrollment process in which the user enrolls a fingerprint, voice sample, image or other biometric data with the device 100. An application 105 may then use the score to determine whether the authentication was successful (e.g., if the score is above a certain specified threshold).

Systems have also been designed for providing secure user authentication over a network using biometric sensors. In such systems, the score 135 generated by the application 105, and/or other authentication data, may be sent over a network to authenticate the user with a remote server. For example, Patent Application No. 2011/0082801 ("'801 Application") describes a framework for user registration and authentication on a network which provides strong authentication (e.g., protection against identity theft and phishing), secure transactions (e.g., protection against "malware in the browser" and "man in the middle" attacks for transactions), and enrollment/management of client authentication tokens (e.g., fingerprint readers, facial recognition devices, smartcards, trusted platform modules, etc).

For certain classes of transactions, the riskiness associated with the transaction may be inextricably tied to the location where the transaction is being performed. For example, it may be inadvisable to allow a transaction that appears to originate in a restricted country, such as those listed on the US Office of Foreign Asset Control List (e.g., Cuba, Libya, North Korea, etc). In other cases, it may only be desirable to allow a transaction to proceed if a stronger authentication mechanism is used; for example, a transaction undertaken from within the corporation's physical premises may require less authentication than one conducted from a Starbucks located in a remote location where the company does not have operations.

However, reliable location data may not be readily available for a variety of reasons. For example, the end user's device may not have Global Positioning System (GPS) capabilities; the user may be in a location where Wifi triangulation data is unavailable or unreliable; the network provider may not support provide cell tower triangulation capabilities to augment GPS, or Wifi triangulation capabilities. Other approaches to divine the device's location may not have a sufficient level of assurance to meet the organization's needs; for example, reverse Internet Packet (IP) lookups to determine a geographic location may be insufficiently granular, or may be masked by proxies designed to mask the true network origin of the user's device.

In these cases, an organization seeking to evaluate the riskiness of a transaction may require additional data to provide them with additional assurance that an individual is located in a specific geographic area to drive authentication decisions.

BRIEF DESCRIPTION OF THE DRAWINGS

A better understanding of the present invention can be obtained from the following detailed description in conjunction with the following drawings, in which:

FIG. 3 illustrates an exemplary set of authentication policy rules;

DETAILED DESCRIPTION OF PREFERRED EMBODIMENTS

Figure 1:
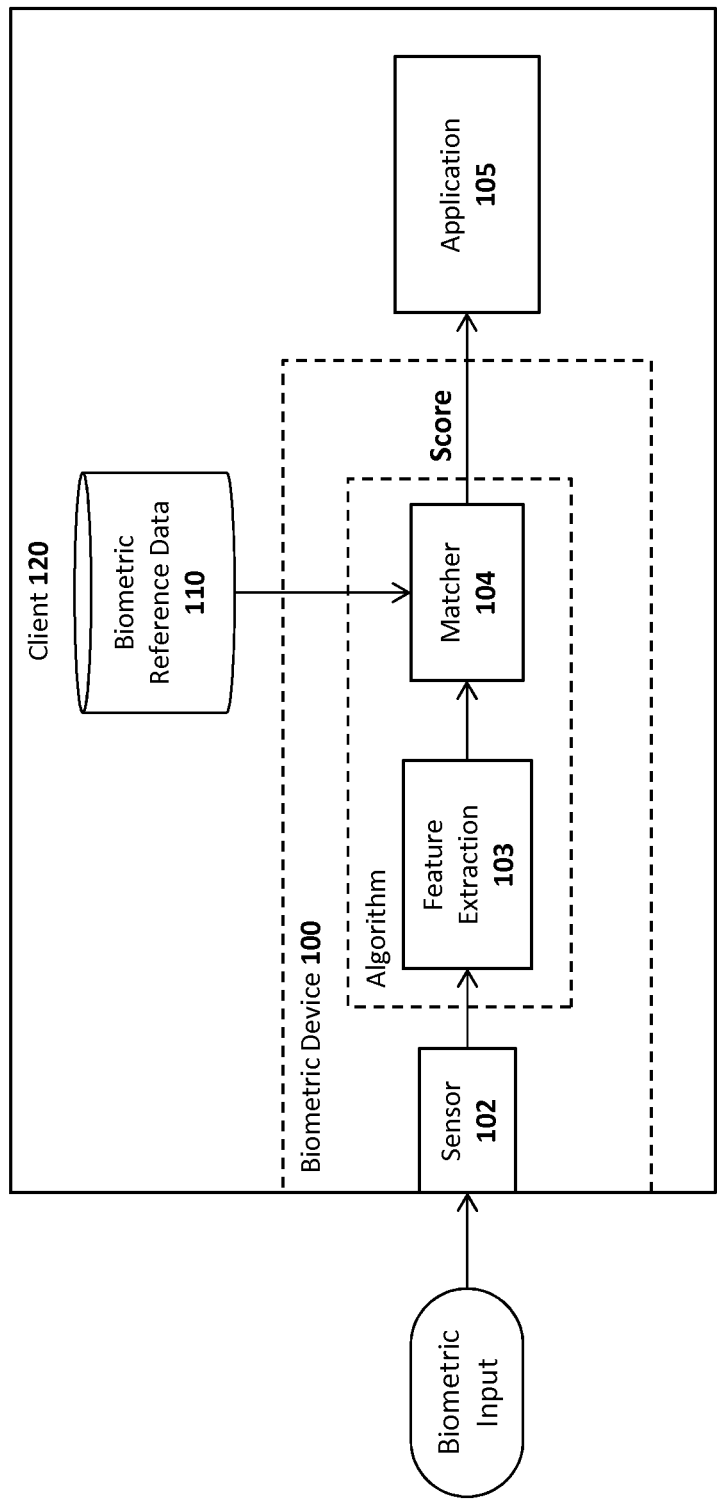
FIG. 1 illustrates an exemplary client equipped with a biometric device.

Described below are embodiments of an apparatus, method, and machine-readable medium for implementing a location-aware authentication policy. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are not shown or are shown in a block diagram form to avoid obscuring the underlying principles of the present invention.

The embodiments of the invention discussed below involve client devices with authentication capabilities such as biometric devices or Personal Identification Number (PIN) entry. These devices are sometimes referred to herein as "tokens," "authentication devices," or "authenticators." Various different biometric devices may be used including, but not limited to, fingerprint sensors, voice recognition hardware/software (e.g., a microphone and associated software for recognizing a user's voice), facial recognition hardware/software (e.g., a camera and associated software for recognizing a user's face), and optical recognition capabilities (e.g., an optical scanner and associated software for scanning the retina of a user). The authentication capabilities may also include non-biometric devices such as trusted platform modules (TPMs) smartcards, Trusted Execution Environments (TEEs), and Secure Elements (SEs)

As mentioned above, in a mobile biometric implementation, the biometric device may be remote from the relying party. As used herein, the "relying party" is the entity which utilizes the authentication techniques described herein to authenticate the end user. For example, the relying party may be an online financial service, online retail service (e.g., Amazon®), cloud service, or other type of network service with which the user is attempting to complete a transaction (e.g., transferring funds, making a purchase, accessing data, etc). In addition, as used herein, the term "remote" means that the biometric sensor is not part of the security boundary of the computer it is communicatively coupled to (e.g., it is not embedded into the same physical enclosure as the relying party computer). By way of example, the biometric device may be coupled to the relying party via a network (e.g., the Internet, a wireless network link, etc) or via a peripheral input such as a USB port. Under these conditions, there may be no way for the relying party to know if the device is one which is authorized by the relying party (e.g., one which provides an acceptable level of authentication and integrity protection) and/or whether a hacker has compromised the biometric device. Confidence in the biometric device depends on the particular implementation of the device.

Location-Aware Authentication Techniques

One embodiment of the invention implements an authentication policy that allows authentication mechanisms to be selected based on the physical location of the client device being used for authentication. For example, the client and/or server may make a determination of the physical location of the client device, and feed that location to a policy engine that evaluates an ordered set of policy rules. In one embodiment, these rules specify classes of locations and the authentication mechanism or mechanisms that must be applied if the client location matches the location definition in the rule.

Figure 2:
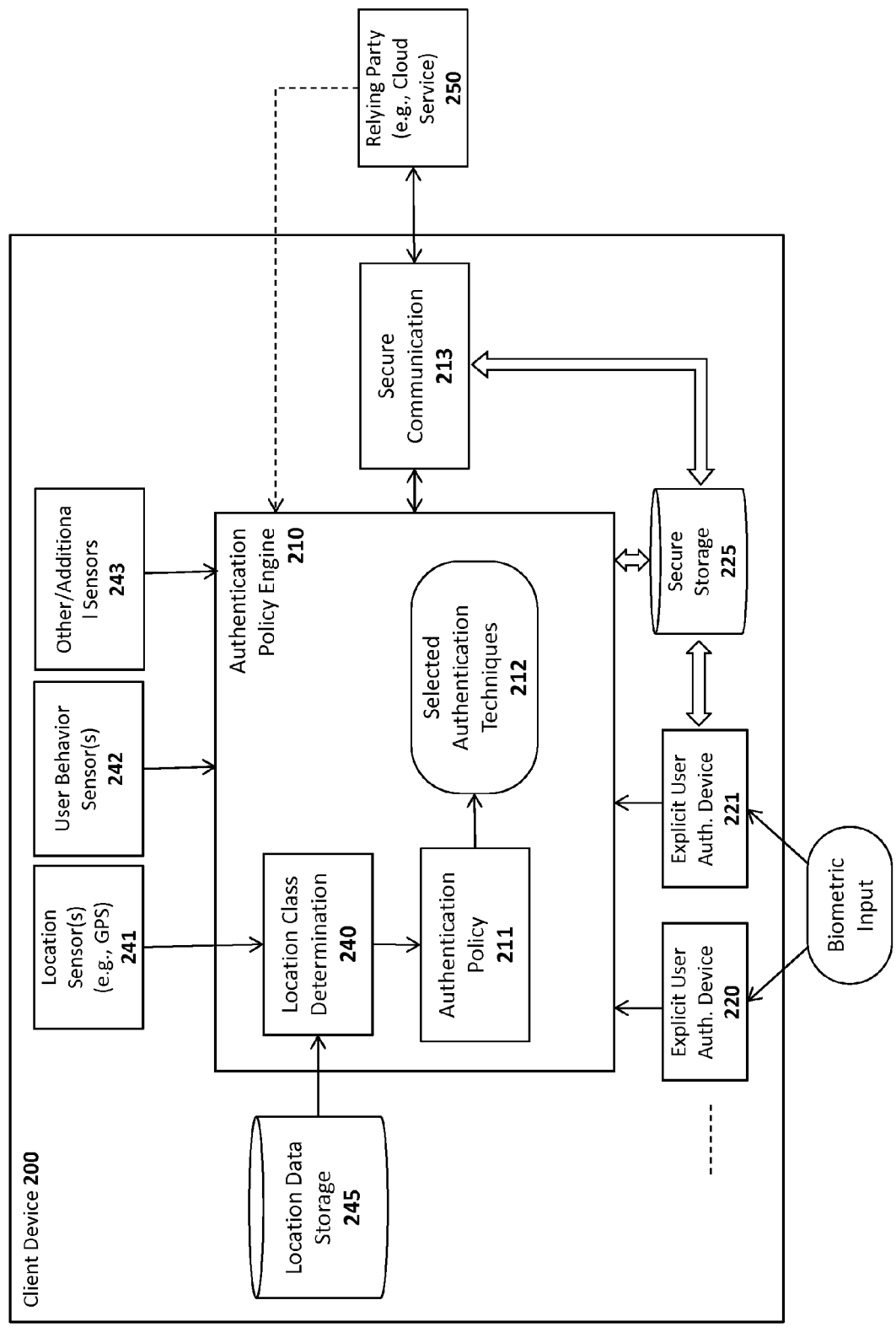
FIG. 2 illustrates one embodiment of a system for performing location-aware application of authentication policy.

As illustrated in FIG. 2, one embodiment of the invention includes a client device 200 with an authentication policy engine 210 for implementing the location-aware authentication policies described herein. In particular, this embodiment includes a location class determination module 240 for using the current location of the client device 200, provided by location sensors 241 (e.g., a GPS device), to identify a current location "class." As discussed in detail below, different location "classes" may be defined comprising known geographical points and/or regions. Location class data may be continuously updated and stored in a persistent location data storage device 245 (e.g., a flash storage or other persistent storage device). The location class determination module 240 may then compare the current location provided by the sensor(s) 241 against the defined "classes" to determine a current location class for the client device 200.

In one embodiment, the relying party 250 specifies the authentication policy to be implemented by the authentication policy engine 210 for each transaction (as indicated by the dotted line from the relying party to the authentication policy engine). Thus, the authentication policy may be uniquely tailored to the authentication requirements of each relying party. In addition, the level of authentication required may be determined based on the current transaction (as defined by the authentication policy). For example, a transaction which requires a transfer of a significant amount of money may require a relatively high authentication assurance threshold, whereas non-monetary transaction may require a relatively lower authentication assurance threshold. Thus, the location-aware authentication techniques described herein may be sufficient for certain transactions but may be combined with more rigorous authentication techniques for other transactions.

In one embodiment, the location class determination module 240 provides the determined class to an authentication policy module 211 which implements a set of rules to identify the authentication techniques 212 to be used for the determined class. By way of example, and not limitation, FIG. 3 illustrates an exemplary set of rules 1-5 specifying one or more authentication techniques 1-5 which may be used for each defined location class 1-5. Although illustrated as a table data structure in FIG. 3, the underlying principles of the invention are not limited to any particular type of data structure for implementing the rule set.

Once the authentication policy engine 210 selects a set of authentication techniques 212, the authentication policy engine 210 may implement the techniques using one or more explicit user authentication devices 220-221 and/or non-intrusive authentication techniques 242-243 to authenticate the user with a relying party 250. By way of example, and not limitation, the explicit user authentication 220-221 may include requiring the user to enter a secret code such as a PIN, fingerprint authentication, voice or facial recognition, and retinal scanning, to name a few.

The non-intrusive authentication techniques 242-243 may include user behavior sensors 242 which collect data related to user behavior for authenticating the user. For example, the biometric gait of the user may be measured using an accelerometer or other type of sensor 242 in combination with software and/or hardware designed to generate a gait "fingerprint" of the user's normal walking pattern. As discussed below, other sensors 243 may be used to collect data used for authentication. For example, network data may be collected identifying network/computing devices within the local proximity of the client device 200 (e.g., known peer computers, access points, cell towers, etc).

In one embodiment, secure storage 225 is a secure storage device used to store authentication keys associated with each of the authentication devices 220-221. As discussed below, the authentication keys may be used to establish secure communication channels with the relying party 250 via a secure communication module 213.

Various different "classes" of locations may be defined consistent with the underlying principles of the invention. By way of example, and not limitation, the following classes of locations may be defined:

Class 1: The client is within a given radius of a specified location. In this class, the associated authentication policy is applied if the current client location is within an area bounded by a circle of a given radius, centered at a specified latitude and longitude.

Class 2: The client is within a specified boundary region. In this class, the associated authentication policy is applied if the client is located within an area bounded by a polygon defined by an ordered set of latitude and longitude pairs (e.g., a closed polygon).

Class 3: The client is outside a specified boundary. In this class, the associated authentication policy is applied if the client is located outside an area bounded by a polygon defined by an ordered set of latitude and longitude pairs (e.g., a closed polygon).

In one embodiment, additional classes are defined using Boolean combinations of the classes and policy rules defined above. For example, the Boolean operations AND, OR, NOT, and the nesting of Boolean operations allow the expression of complex conditions. Such policies could be used, for example, to implement a policy that applies when the client is located in one of a variety of facilities owned by a company.

Various different mechanisms may be used to determine the current physical location of the client (represented generally in FIG. 2 as location sensors 241), including, but not limited to the following:

GPS: Embedded GPS sensors can directly provide details on the location of the client. New emerging standards seek to add authentication of the location provided as a capability that address this shortcoming in current GPS solutions.

Geo-IP Lookup: Reverse lookups of the client's IP address can be used to determine a coarse approximation of the client's location. However, the trustworthiness of the location obtained through this method requires the IP address to be cross-checked against blacklists of known compromised hosts, anonymizing proxy providers, or similar solutions designed to obfuscate the source IP address of the host.

Cell Tower Triangulation: Integration between the client, the server, and wireless carrier infrastructure could allow the client and server to perform high resolution determination of physical location using cellular signal strength triangulation.

Wi-Fi Access Point Triangulation: A higher resolution method to determine physical location is to triangulate the signal strength of nearby Wifi access points with known physical locations. This method is particularly effective in determining the location of a device within facilities.

Location Displacement Inference: A device's exact location may be unknown, but a statistical probability of location may be used as an approximation for the purpose of evaluating policy. This may be calculated by noting the change in the device's position relative to a starting point with a known location; the user's device may have, in the past, had a known starting point, and in the interim has moved a known or estimate distance and bearing, allowing an approximate location to be calculated. Possible methods to calculate the displacement from the starting point may include inferring distance traveled using measurements gathered from an accelerometer (i.e. using the accelerometer to measure how far the user walked based on gait measurement), changes in signal strength from a known, stationary set of signal sources, and other methods.

Figure 4:
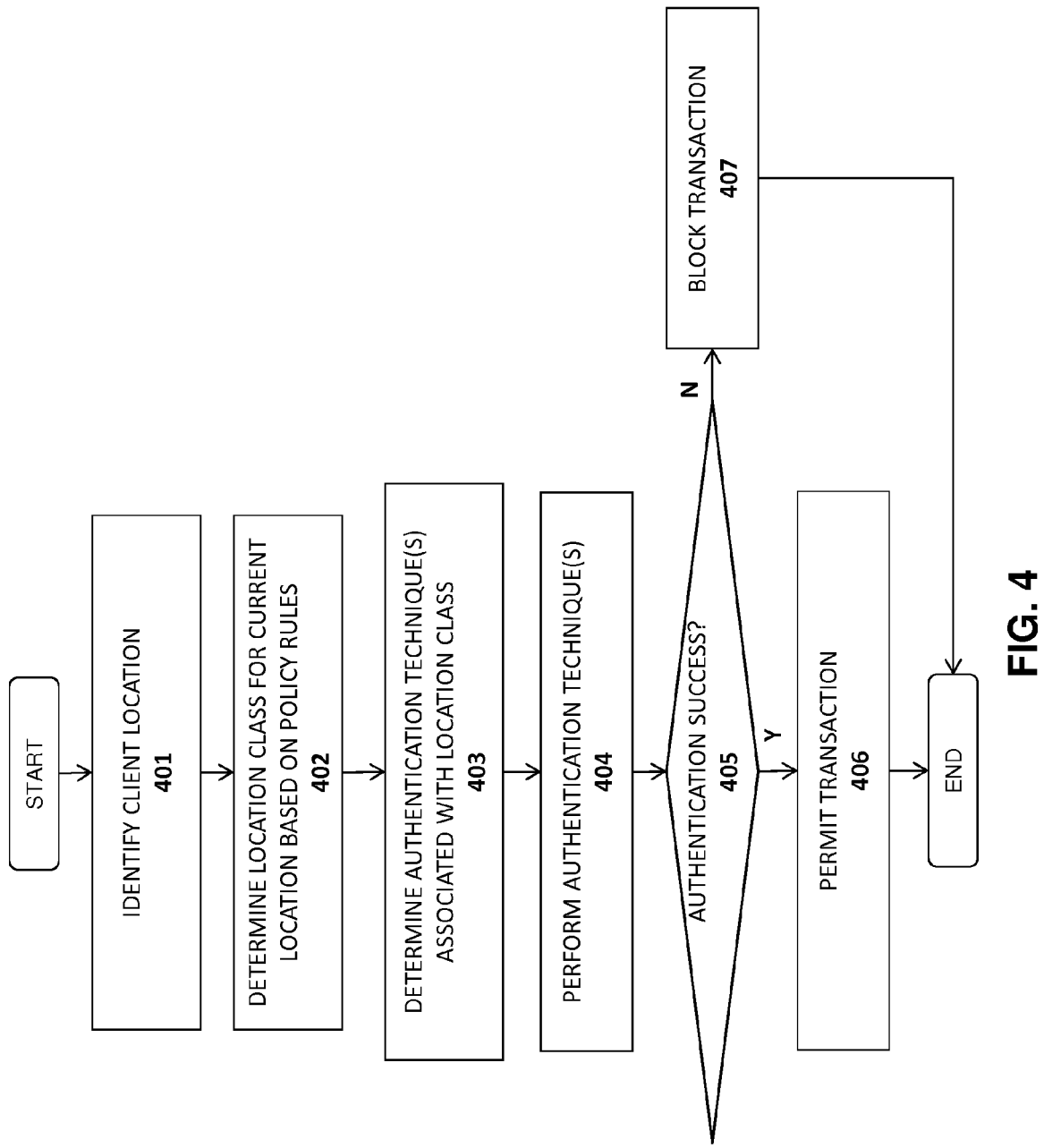
FIG. 4 illustrates a method in accordance with one embodiment of the invention.

FIG. 4 illustrates one embodiment of a method for implementing a location-aware authentication policy. The method may be executed within the context of the system architecture shown in FIGS. 2-3 but is not limited to any particular system architecture.

At 401 the client's location is identified using one or more available techniques (e.g., GPS, triangulation, peer/network device detection, etc). At 402, one or more location classes (and potentially Boolean combinations of classes) are identified for the current location based on an existing set of policy rules. At 403, one or more authentication techniques are identified according to the location class(es). For example, if the client device is currently at a location known to be the user's home or office or within a defined radius of another trusted location, then minimal (or no) authentication may be required. By contrast, if the client device is currently at an unknown location and/or a location known to be untrusted, then more rigorous authentication may be required (e.g., biometric authentication such as a fingerprint scan, PIN entry, etc). At 404, the authentication techniques are employed and if authentication is successful, determined at 405, then the transaction requiring authentication is authorized at 406.

As mentioned above, the level of authentication required may be determined based on the current transaction. For example, a transaction which requires a transfer of a significant amount of money may require a relatively high authentication assurance threshold, whereas non-monetary transaction may require a relatively lower authentication assurance threshold. Thus, the location-aware authentication techniques described herein may be sufficient for certain transactions but may be combined with more rigorous authentication techniques for other transactions.

If authentication is not successful, then the transaction is blocked at 407. At this stage, the transaction may be permanently blocked or additional authentication steps may be requested. For example, if the user entered an incorrect PIN, the user may be asked to re-enter the PIN and/or perform biometric authentication.

The embodiments of the invention described herein provide numerous benefits to authentication systems. For example, the described embodiments may be used to efficiently block access from unauthorized locations, reducing unauthorized access by limiting the location from which users are permitted to attempt authentication (e.g., as defined by location classes). In addition, the embodiments of the invention may selectively require stronger authentication to respond to location-specific risks. For example, the relying party can minimize the inconvenience of authentication when a user is entering into a transaction from a known location, while retaining the ability to require stronger authentication when the user/client is connecting from an unknown or unexpected location. Moreover, the embodiments of the invention enable location-aware access to information. Alternatively, a location-centric policy may be used by a relying party to provide a user with additional access to location-specific information. By way of example, and not limitation, a user located in a Walmart may be granted access to special offers from Amazon.com when the user logs into their Amazon.com account on their mobile phone.

As mentioned above, the location of the client device 200 may be determined using a variety of different techniques. In one particular embodiment, the definition of a "location" may not be tied to a set of physical coordinates (as with GPS), but instead be prescribed by the presence of a set of peer devices or other types of network devices. For example, when at work, the client's wireless network adapters (e.g., Wifi adapter, Bluetooth adapter, LTE adapter, etc) may "see" a set of peer network devices (e.g., other computers, mobile phones, tablets, etc) and network infrastructure devices (e.g., Wifi access points, cell towers, etc) on a consistent basis. Thus, the presence of these devices may be used for authentication when the user is at work. Other locations may be defined by the presence of devices in a similar manner such as when the user is at home.

For example, using the techniques described herein, a location may be defined as "with my work colleagues" or "at work" where the presence of a set of peer devices known to be owned by the user's work colleagues may be used as a proxy for the risk that needs to be mitigated by authentication policy. For example, if a user is surrounded by a set of known peer devices or other types of network devices, then the user may be deemed to be less of a risk than if no known devices are detected.

Figure 5:
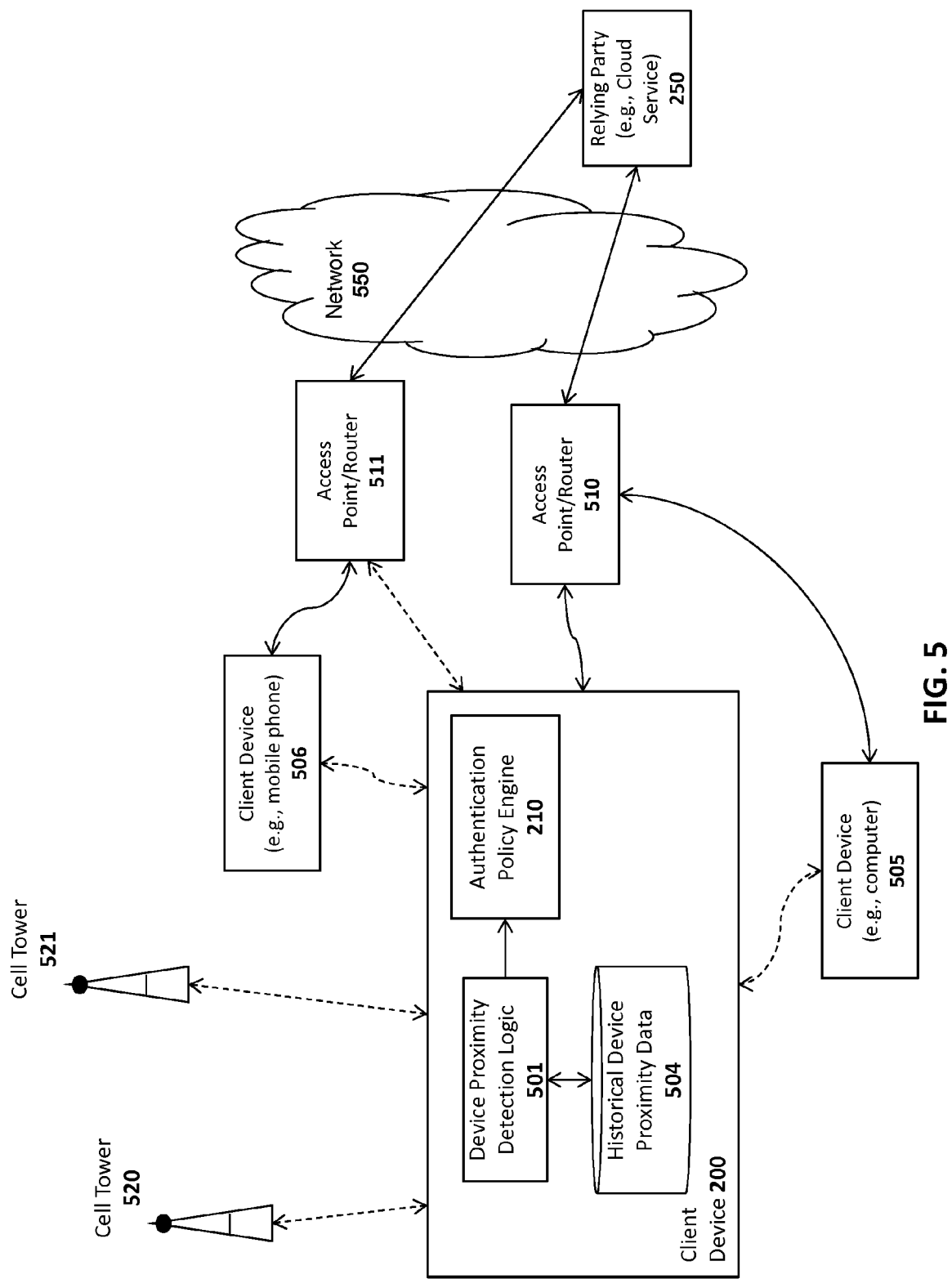
FIG. 5 illustrates one embodiment of the invention in which location is determined or confirmed by proximity of other peer or network devices.

FIG. 5 illustrates one embodiment in which a "location" is defined by a set of peer devices and other network devices. In the illustrated example, the client device 200 "sees" two different peer devices 505-506 (e.g., client computers, mobile phones, tablets, etc); two different wireless access points 510-511; and two different cell towers 520-521. As used herein, the client device 200 may "see" without formally establishing a connection with each of the other devices. For example, the client may see a variety of peer devices connected to the work LAN and/or may see the wireless signals generated by those devices regardless of whether the client connects to those devices. Similarly, the client device 200 may see the basic service set identification (BSSID) for a variety of different Wifi access points (e.g., Wifi from nearby hotels, coffee shops, work Wifi access points). The client device 200 may also see a variety of different cell towers 520-521, potentially even those operated by different cell carriers. The presence of these devices may be used to define a location "fingerprint" for the user's work location.

As illustrated, device proximity detection logic 501 on the client device 200 may capture data related to visible devices and compare the results against historical device proximity data 504. The historical device proximity data 504 may be generated over time and/or through a training process. For example, in one embodiment, the user may specify when he/she is at work, at home, or at other locations (either manually, or when prompted to do so by the client 200). In response, the device proximity detection logic 501 may detect the devices in the vicinity and persistently store the results as historical device proximity data 504. When the user subsequently returns to the location, the device proximity detection logic 501 may compare the devices that it currently "sees" against the devices stored as historical proximity data 504 to generate a correlation between the two. In general, the stronger the correlation, the more likely it is that the client is at the specified location. Over time, devices which are seen regularly may be prioritized above other devices in the historical device proximity data 504 (e.g., because these devices tend to provide a more accurate correlation with the user's work location).

In one embodiment, the authentication policy engine 210 may use the correlation results provided by the device proximity detection logic 501 to determine the level of authentication required by the user for each relying party 250. For example, if a high correlation exists (i.e., above a specified threshold), then the authentication policy engine may not require explicit authentication by the end user. By contrast, if there is a low correlation between the user's current location and the historical device proximity data 504 (i.e., below a specified threshold), then the authentication policy engine 210 may require more rigorous authentication (e.g., a biometric authentication such as a fingerprint scan and/or requesting PIN entry).

In one embodiment, the device proximity detection logic 501 identifies the set of other devices that are in the client's proximity which have been authenticated. For example, if several of a user's colleagues have already authenticated successfully, then there may be less risk associated with allowing the user to access certain data with a less reliable authenticator, simply because the user is operating in the presence of his/her peers. In this embodiment, peer-to-peer communication over standards such as 802.11n may be used to collect authentication tokens from peers that can be used to prove those peers have already authenticated.

In another embodiment, the device proximity detection logic 501 may also detect a previously authenticated device that is paired with the user's client (e.g., such as the user's mobile phone or tablet). The presence of another authenticated device that is used by the same user that is attempting to authenticate may be used as an input to the authentication decision, particularly when accessing the same application.

In one embodiment, the historical device proximity data 504 is collected and shared across multiple devices, and may be stored and maintained on an intermediate authentication service. For example, a history of groups of peers and network devices in each location may be tracked and stored in a central database accessible to the device proximity detection logic 501 on each device. This database may then be used as an input to determine the risk of an attempted authentication from a particular location.

Embodiments for Confirming Location Using Supplemental Sensor and/or Location Data As mentioned above, one embodiment of the invention leverages data from additional sensors 243 from the mobile device to provide supplemental inputs to the risk calculation used for authentication. These supplemental inputs may provide additional levels of assurance that can help to either confirm or refute claims of the location of the end user's device.

Figure 6:
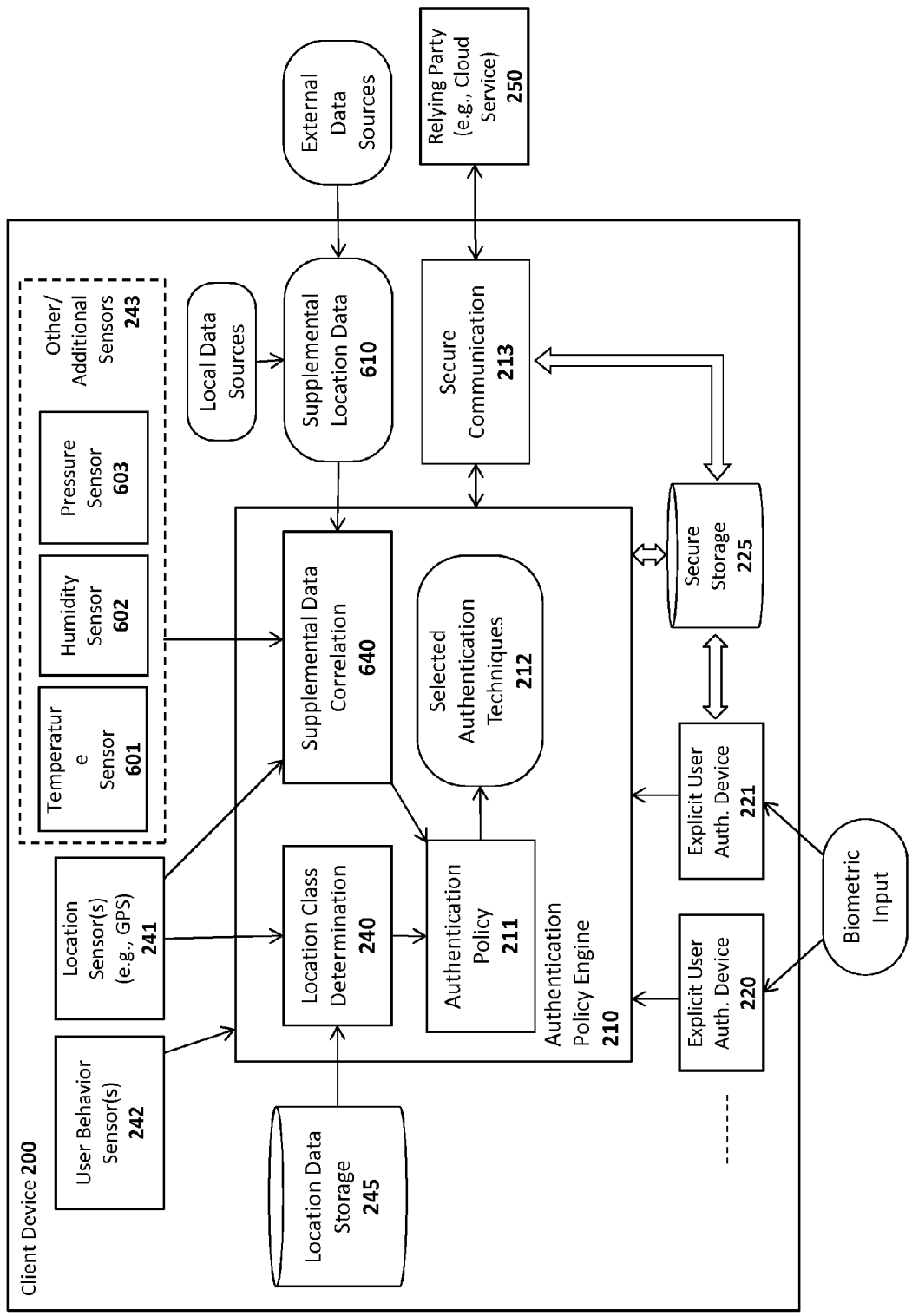
FIG. 6 illustrates one embodiment of a system for authentication which uses environmental sensors.

As illustrated in FIG. 6 the additional sensors 243 which provide supplemental assurance of the device's location may include temperature sensors 601, humidity sensors 602 and pressure sensors 603 (e.g., barometric or altimeter pressure sensors). In one embodiment, the sensors provide temperature, humidity, and pressure readings, respectively, which are used by a supplemental data correlation module 640 of the authentication policy engine 210 to correlate against supplemental data 610 known about the location provided by the location sensor(s) 241 (or the location derived using the various other techniques described herein). The results of the correlation are then used by the authentication policy module 211 to select one or more authentication techniques 212 for a given transaction. As indicated in FIG. 6, the supplemental location data 610 may include data collected from external sources (e.g., the Internet or other mobile devices) and local data sources (e.g., historical data collected during periods when the device is known to be in possession of the legitimate user).

The supplemental data correlation module 640 may use the data provided by the additional sensors 243 in a variety of different ways to correlate against the supplemental location data 610. For example, in one embodiment, the supplemental location data 610 includes current local meteorological conditions at the location provided by the location sensor(s) 241. By comparing the humidity, temperature, or barometric pressure gathered from the additional sensors 243 against real-time local weather data 610, the supplemental data correlation module 640 identifies cases where the sensor data is inconsistent with local conditions. For example, if the client device's GPS reading indicates that the device is outside, yet the temperature, humidity, or barometric pressure are not consistent with the local weather conditions, then the supplemental data correlation module 640 may generate a low correlation score and the location may be deemed less trustworthy. Consequently, the authentication policy module 211 may require more rigorous authentication techniques 212 (e.g., fingerprint, PIN entry, etc) to approve a transaction.

As another example, by comparing the altitude provided by an altimeter pressure sensor 603 against the known geographical or network topology of the claimed location (provided with the supplemental location data 610), the supplemental data correlation module 640 may identify discrepancies that signal the claimed location is not genuine. For example, if a reverse IP lookup of the user's claimed location identifies them as being in the Andes Mountains, but altimeter data from the device indicates the device is at sea level, then the supplemental data correlation module 640 may generate a low correlation score and the location may be deemed less trustworthy. As a result of the low correlation score, the authentication policy module 211 may attempt to mitigate the higher risk with stronger authentication for the transaction.

In one embodiment, the supplemental data correlation module 640 compares data gathered from sensors 243 on the user's device against multiple other end users in the immediate area to identify anomalies that suggest the user is not operating in the same physical location as those known users. For example, if a set of authenticated users are identified who are operating the same physical area, and all of those users' devices note that the local temperature in the area is 10° C., the supplemental data correlation module 640 may generate a low correlation score for an end user whose temperature sensor 601 indicates the local temperature is 20° C. As a result, the authentication policy 211 may require more rigorous authentication techniques 212.

As yet another example, the supplemental data correlation module 640 may compare current readings against historical data for a particular user. For example, as mentioned, sensor data may be analyzed during periods of time when the user is known to be in possession of the device 200 (e.g., for a time period following an explicit authentication). The supplemental data correlation module 640 may then look for discontinuities in the local data to identify suspicious behavior. For example, if the user's ambient temperature normally floats between 10° C. and 20° C. and it is currently at 30° C., this may indicate the user is not in a typical location, thereby generating a low correlation and causing the authentication policy module 211 to require an additional level of scrutiny for a transaction.

The supplemental data correlation module 640 may perform various different types of correlations between sensor data and supplemental location data while still complying with the underlying principles of the invention. For example, various known correlation mechanisms may be used to determine the statistical relationship between the two sets of data. In one embodiment, the correlation score provided to the authentication policy engine 211 comprises a normalized value (e.g., between 0-1) indicating a level of correlation. In one embodiment, various threshold levels may be set for detected differences between the sensors 243 and supplemental location data 610. For example, if the temperature sensor 601 measures a temperature of more than 3 degrees off of the current temperature (gathered from other devices or the Internet), then a first threshold may be triggered (resulting in a lowering of the correlation score). Each additional 3 degrees off from the current temperature may then result in a new threshold being met (resulting in a corresponding lowering of the correlation score). It should be noted, however, that these are merely examples of one embodiment of the invention; the underlying principles of the invention are not limited to any particular manner of performing a correlation.

Figure 7:
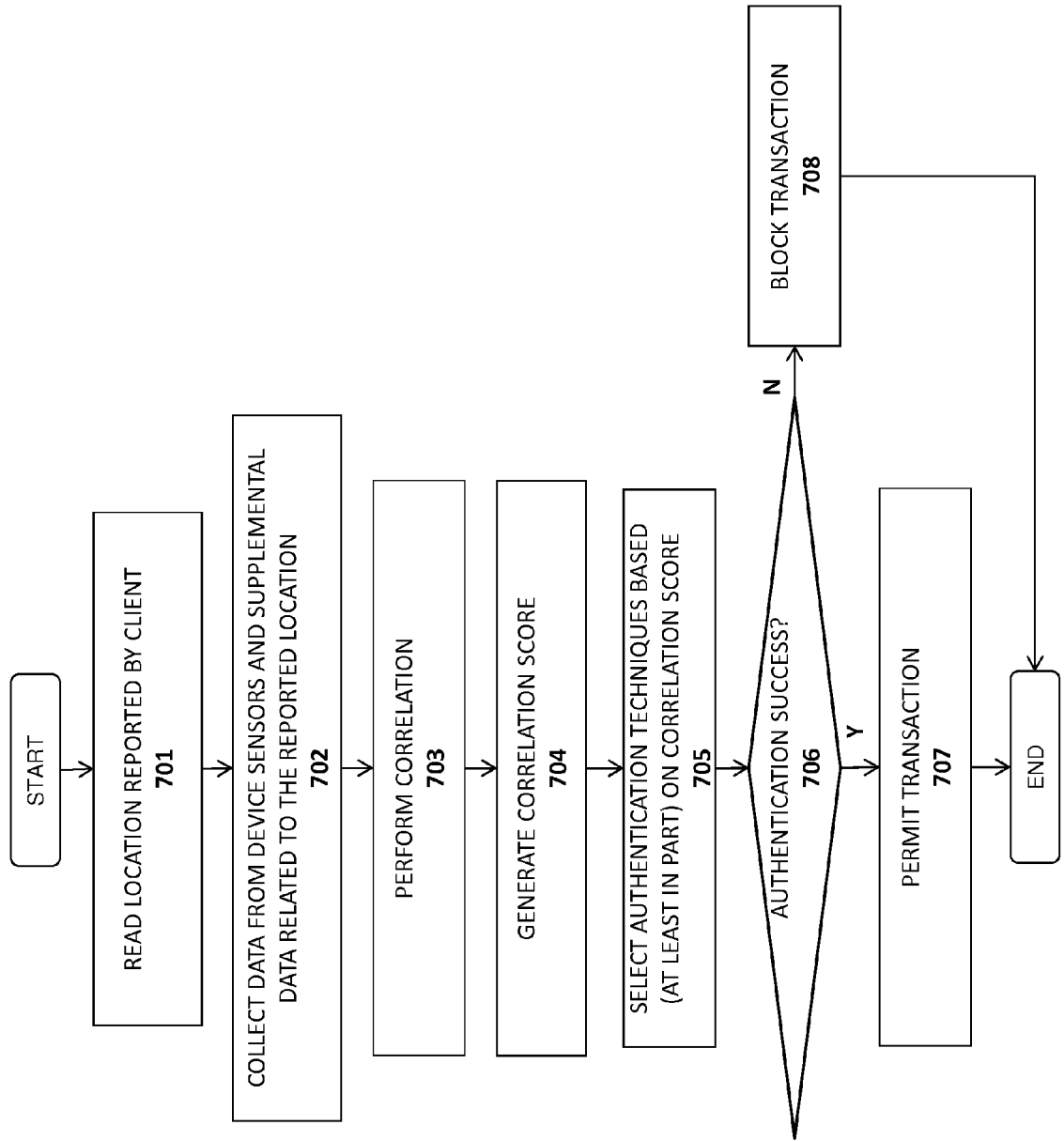
FIG. 7 illustrates one embodiment of a method for authentication which uses environmental sensors.

A method in accordance with one embodiment of the invention is illustrated in FIG. 7. At 701, the current location being reported by the client device (e.g., via the GPS module on the device) is read. At 702, supplemental location data is collected for the reported location along with sensor data from the client device. As mentioned above, the supplemental location data may be collected locally or remotely (e.g., from other clients and/or servers on the Internet) and may include data such as the current temperature, pressure and/or humidity for the reported location. The sensor data may be provided by temperature sensors, barometric or altimeter pressure sensors, and/or humidity sensors.

At 703, a correlation is performed between the supplemental location data and the sensor data provided by the device sensors. In one embodiment, a relatively higher correlation will result in a relatively higher correlation score at 704 whereas lower correlations will result in relatively lower correlation scores. As mentioned, in one embodiment, the correlation score is a normalized value (e.g., between 0-1) indicating the similarity between the sensor readings and supplemental data.

At 705 one or more authentication techniques are selected based (at least in part) on the correlation score. For example, if a relatively low correlation score is provided, then more rigorous authentication techniques may be selected whereas if a relatively high correlation exists then less rigorous authentication techniques may be selected (potentially those which do not require explicit authentication by the end user).

If the user successfully authenticates using the selected techniques, determined at 706, then the transaction is allowed to proceed at 707. If not, then the transaction is blocked at 708.

Numerous benefits are realized from the above embodiments. For example, these embodiments provide an additional level of assurance for location data gather from other sources: Allows the organization to supplement location data gathered from other sources (IP, GPS, etc) in order to gain additional assurance that the location is authentic. In addition, the embodiments of the invention may block a transaction from an unauthorized location, reducing unauthorized access by limiting the location from which users can even attempt authentication. Moreover, these embodiments may force stronger authentication to respond to location-specific risks (e.g., the relying party can minimize the inconvenience of authentication when the user is accessing information from a known location, while retaining the ability to require stronger authentication when the user/client is accessing from an unknown or unexpected location, or a location whose veracity can't be sufficiently qualified using multiple inputs).

Exemplary System Architectures

Figure 8A:
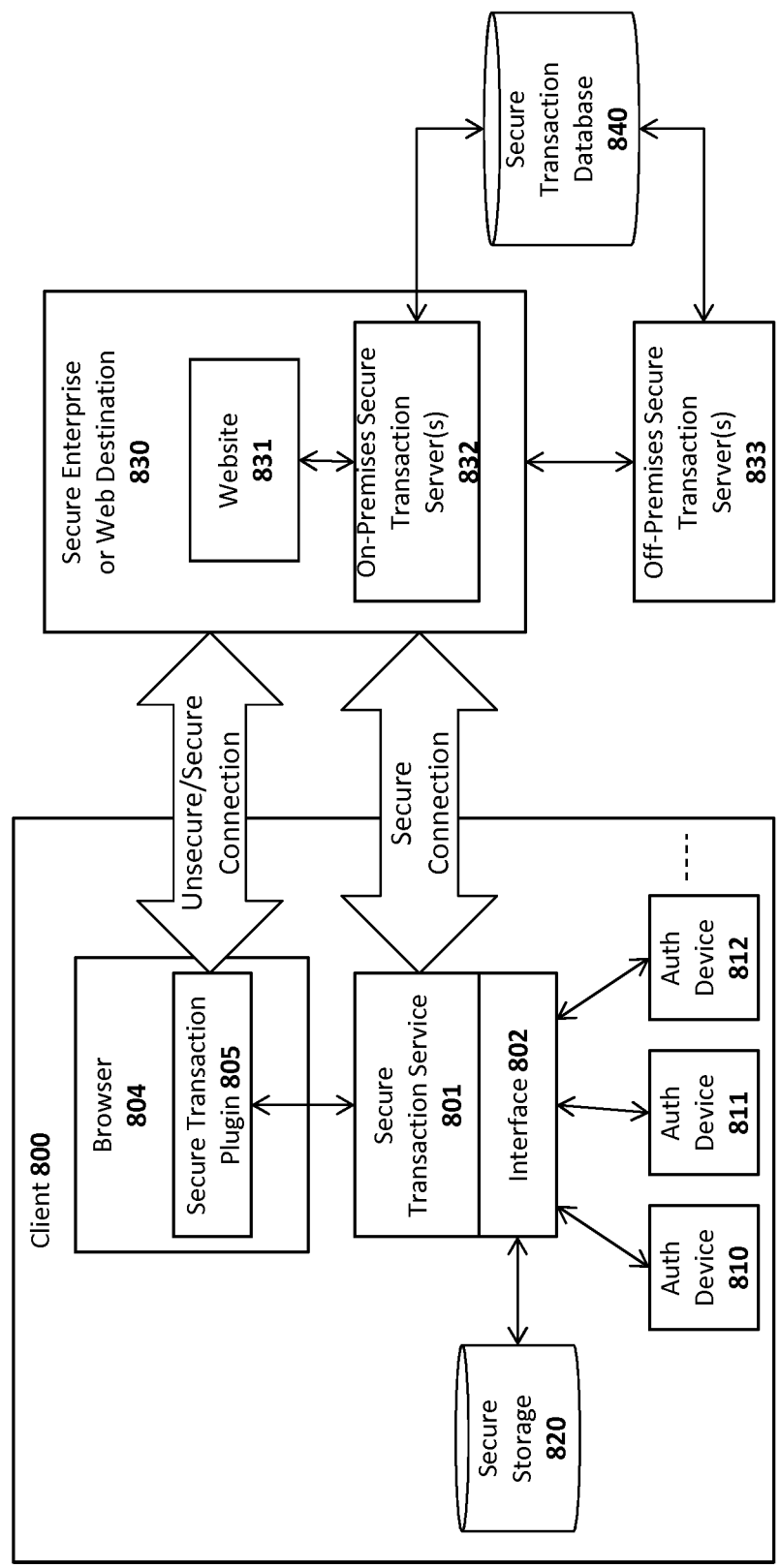
FIGS. 8A-B illustrate exemplary system architectures on which the embodiments of the invention may be implemented.
Figure 8B:
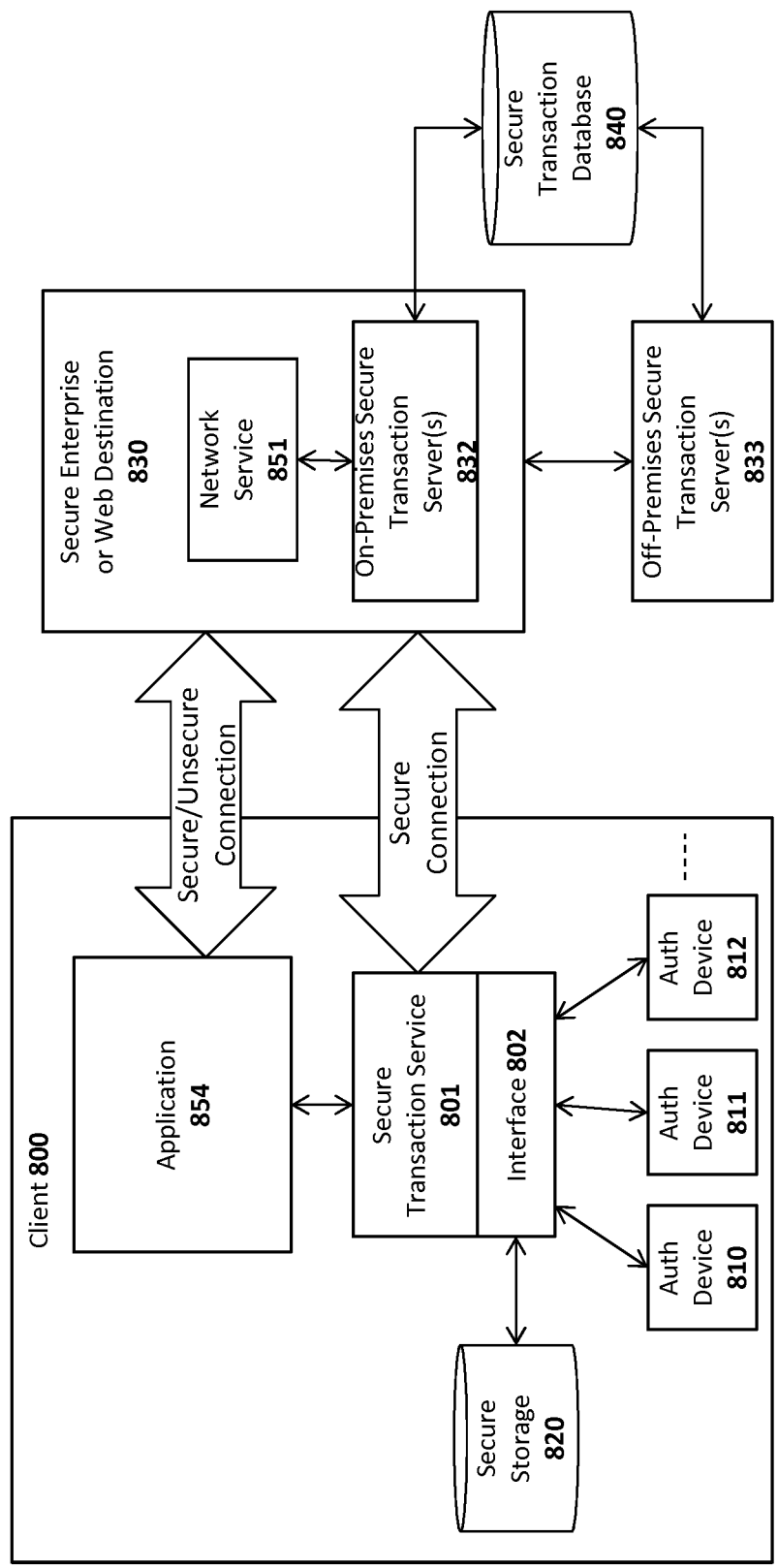

FIGS. 8A-B illustrate two embodiments of a system architecture comprising client-side and server-side components for authenticating a user. The embodiment shown in FIG. 8A uses a browser plugin-based architecture for communicating with a website while the embodiment shown in FIG. 8B does not require a browser. The various location-aware authentication techniques described herein including the use of environmental sensors during authentication may be implemented on either of these system architectures. For example, the authentication policy engine 210 shown in FIGS. 2 and 6 may be implemented as part of the secure transaction service 801 (including interface 802) and/or the secure transaction plugin 805 or application 852. In such an implementation, the authentication policy of the secure enterprise or Web destination 830 (e.g., the "relying party") may be provided to the secure transaction service 801 via the secure connection. It should be noted, however, that the embodiment illustrated in FIGS. 2 and 6 may be implemented using logical arrangements of hardware and software other than those shown in FIGS. 8A-B.

While the secure storage 820 is illustrated outside of the secure perimeter of the authentication device(s) 810-812, in one embodiment, each authentication device 810-812 may have its own integrated secure storage. Alternatively, each authentication device 810-812 may cryptographically protect the biometric reference data records (e.g., wrapping them using a symmetric key to make the storage 820 secure).

Turning first to FIG. 8A, the illustrated embodiment includes a client 800 equipped with one or more authentication devices 810-812 for enrolling and authenticating an end user. As mentioned above, the authentication devices 810-812 may include biometric devices such as fingerprint sensors, voice recognition hardware/software (e.g., a microphone and associated software for recognizing a user's voice), facial recognition hardware/software (e.g., a camera and associated software for recognizing a user's face), and optical recognition capabilities (e.g., an optical scanner and associated software for scanning the retina of a user) and non-biometric devices such as a trusted platform modules (TPMs) and smartcards.

The authentication devices 810-812 are communicatively coupled to the client through an interface 802 (e.g., an application programming interface or API) exposed by a secure transaction service 801. The secure transaction service 801 is a secure application for communicating with one or more secure transaction servers 832-833 over a network and for interfacing with a secure transaction plugin 805 executed within the context of a web browser 804. As illustrated, the Interface 802 may also provide secure access to a secure storage device 820 on the client 800 which stores information related to each of the authentication devices 810-812 such as a device identification code, user identification code, user enrollment data (e.g., scanned fingerprint or other biometric data), and keys used to perform the secure authentication techniques described herein. For example, as discussed in detail below, a unique key may be stored into each of the authentication devices and used when communicating to servers 830 over a network such as the Internet.

As discussed below, certain types of network transactions are supported by the secure transaction plugin 805 such as HTTP or HTTPS transactions with websites 831 or other servers. In one embodiment, the secure transaction plugin is initiated in response to specific HTML tags inserted into the HTML code of a web page by the web server 831 within the secure enterprise or Web destination 830 (sometimes simply referred to below as "server 830"). In response to detecting such a tag, the secure transaction plugin 805 may forward transactions to the secure transaction service 801 for processing. In addition, for certain types of transactions (e.g., such as secure key exchange) the secure transaction service 801 may open a direct communication channel with the on-premises transaction server 832 (i.e., co-located with the website) or with an off-premises transaction server 833.

The secure transaction servers 832-833 are coupled to a secure transaction database 840 for storing user data, authentication device data, keys and other secure information needed to support the secure authentication transactions described below. It should be noted, however, that the underlying principles of the invention do not require the separation of logical components within the secure enterprise or web destination 830 shown in FIG. 8A. For example, the website 831 and the secure transaction servers 832-833 may be implemented within a single physical server or separate physical servers. Moreover, the website 831 and transaction servers 832-833 may be implemented within an integrated software module executed on one or more servers for performing the functions described below.

As mentioned above, the underlying principles of the invention are not limited to a browser-based architecture shown in FIG. 8A. FIG. 8B illustrates an alternate implementation in which a stand-alone application 854 utilizes the functionality provided by the secure transaction service 801 to authenticate a user over a network. In one embodiment, the application 854 is designed to establish communication sessions with one or more network services 851 which rely on the secure transaction servers 832-833 for performing the user/client authentication techniques described in detail below.

In either of the embodiments shown in FIGS. 8A-B, the secure transaction servers 832-833 may generate the keys which are then securely transmitted to the secure transaction service 801 and stored into the authentication devices within the secure storage 820. Additionally, the secure transaction servers 832-833 manage the secure transaction database 820 on the server side.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable program code. The machine-readable medium may include, but is not limited to, floppy diskettes, optical disks, CD-ROMs, and magneto-optical disks, ROMs, RAMs, EPROMs, EEPROMs, magnetic or optical cards, or other type of media/machine-readable medium suitable for storing electronic program code.

Throughout the foregoing description, for the purposes of explanation, numerous specific details were set forth in order to provide a thorough understanding of the invention. It will be apparent, however, to one skilled in the art that the invention may be practiced without some of these specific details. For example, it will be readily apparent to those of skill in the art that the functional modules and methods described herein may be implemented as software, hardware or any combination thereof. Moreover, although some embodiments of the invention are described herein within the context of a mobile computing environment, the underlying principles of the invention are not limited to a mobile computing implementation. Virtually any type of client or peer data processing devices may be used in some embodiments including, for example, desktop or workstation computers. Accordingly, the scope and spirit of the invention should be judged in terms of the claims which follow.

I claim:

1. A method for user authentication implemented on a client device comprising a memory for storing program code and a processor for processing the program code to cause operations to be performed on the client device comprising:

collecting environmental sensor data from one or more sensors configured on the client device;

determining a current geographical location of the client device from one or more location sensors configured on the client device;

using the geographical location to identify supplemental data associated with the location;

comparing the environmental sensor data with the supplemental data to arrive at a correlation score indicating a level of correlation between the environmental sensor data and the supplemental data, the operation of comparing performed through execution of the program code by the processor; and responsively selecting one or more authentication techniques for authenticating a user of the client device based on the correlation score and based on an authentication policy associated with a relying party, the operation of responsively selecting performed through execution of the program code by the processor, the authentication techniques including biometric authentication techniques implemented using one or more biometric sensors communicatively coupled to the client device and configured to sense biometric data provided by the user, wherein responsively selecting further comprises selecting a first set of one or more authentication techniques required to meet a first specified assurance threshold for correlation scores below a specified correlation threshold and selecting a second set of one or more authentication techniques required to meet a second specified assurance threshold for correlation scores above the specified correlation threshold, the first specified assurance threshold being greater than the second specified assurance threshold;

wherein the supplemental data is collected from one or more network servers known to include accurate environmental data for the reported location.

2. The method as in claim 1 wherein the environmental sensor data comprises a temperature reading, a humidity reading, or a pressure reading.

3. The method as in claim 2 wherein the supplemental data comprises a current temperature, humidity, or pressure associated with the location.

4. The method as in claim 3 wherein the supplemental data is collected from one or more other client devices known to be at the reported location or within a specified distance from the reported location.

5. The method as in claim 3 wherein the supplemental data includes historical data related to the location.

6. The method as in claim 1 wherein comparing comprises determining differences between the supplemental data and the environmental sensor data.

7. The method as in claim 6 wherein the greater the differences, the lower the correlation score and the smaller the differences, the greater the correlation score.

8. The method as in claim 1 wherein for correlation scores below a specified threshold, one or more explicit user authentication techniques are required.

9. The method as in claim 8 wherein the explicit user authentication techniques include manual user personal identification number (PIN) entry, fingerprint authentication, voice authentication, facial authentication, or retinal scan authentication.

10. The method as in claim 1 wherein for correlation scores above a specified threshold, one or more non-intrusive user authentication techniques are implemented.

11. The method as in claim 10 wherein one of the non-intrusive techniques comprises collecting data from one or more additional sensors to detect known behavior of the user.

12. The method as in claim 11 wherein the known behavior of the end user comprises the user's gait.

13. A client device comprising a memory for storing program code, one or more sensors, and a processor for processing the program code for user authentication comprising:

one or more environmental sensors configured on the client device providing environmental sensor data;

one or more location sensors configured on the client device to determine a current geographical location of the client device;

a supplemental data collection module comprising program code executed by the processor to use the geographical location reported by the one or more location sensors to identify supplemental data associated with the location;

the supplemental data correlation module to compare the environmental sensor data with the supplemental data to arrive at a correlation score indicating a level of correlation between the environmental sensor data and the supplemental data; and an authentication policy module comprising program code executed by the processor to responsively select one or more authentication techniques for authenticating a user of the client device based on the correlation score and based on an authentication policy associated with a relying party; and one or more biometric sensors communicatively coupled to the client device and configured to sense biometric data provided by the user;

wherein the authentication techniques include biometric authentication techniques implemented using the one or more biometric sensors communicatively coupled to the client device and configured to sense biometric data provided by the user, wherein to responsively select the authentication techniques, the authentication policy module is configured to select a first set of one or more authentication techniques required to meet a first specified assurance threshold for correlation scores below a specified correlation threshold and to select a second set of one or more authentication techniques required to meet a second specified assurance threshold for correlation scores above the specified correlation threshold, the first specified assurance threshold being greater than the second specified assurance threshold;

wherein the supplemental data is collected from one or more network servers known to include accurate environmental data for the reported location.

14. The client device as in claim 13 wherein the environmental sensors comprise a temperature sensor, a humidity sensor or a pressure sensor and wherein the sensor data comprises a temperature reading, a humidity reading, and/or a pressure reading.

15. The client device as in claim 14 wherein the supplemental data comprises a current temperature, humidity, or pressure associated with the location.

16. The client device as in claim 15 wherein the supplemental data is collected from one or more other client devices known to be at the reported location or within a specified distance from the reported location.

17. The client device as in claim 15 wherein the supplemental data includes historical data related to the location.

18. The client device as in claim 13 wherein comparing comprises determining differences between the supplemental data and the environmental sensor data.

19. The system as in claim 18 wherein the greater the differences, the lower the correlation score and the smaller the differences, the greater the correlation score.

20. The client device as in claim 13 wherein for correlation scores below a specified threshold, one or more explicit user authentication techniques are required.

21. The client device as in claim 20 wherein the explicit user authentication techniques include manual user personal identification number (PIN) entry, fingerprint authentication, voice authentication, facial authentication, or retinal scan authentication.

22. The client device as in claim 13 wherein for correlation scores above a specified threshold, one or more non-intrusive user authentication techniques are implemented.

23. The client device as in claim 22 wherein one of the non-intrusive techniques comprises collecting data from one or more additional sensors to detect known behavior of the user.

24. The client device as in claim 23 wherein the known behavior of the end user comprises the user's gait.

* * * * *